US012297797B1

United States Patent
Newbury

(10) Patent No.: US 12,297,797 B1
(45) Date of Patent: May 13, 2025

(54) OFFSHORE FLOATING WAVE GENERATOR ASSEMBLY

(71) Applicant: James Newbury, Red Hill (AU)

(72) Inventor: James Newbury, Red Hill (AU)

( * ) Notice: Subject to any disclaimer, the term of this patent is extended or adjusted under 35 U.S.C. 154(b) by 0 days.

(21) Appl. No.: 18/732,148

(22) Filed: Jun. 3, 2024

(30) Foreign Application Priority Data

Nov. 13, 2023  (AU) ................................ 2023903638

(51) Int. Cl.
*F03B 13/18* (2006.01)

(52) U.S. Cl.
CPC ........ *F03B 13/183* (2013.01); *F05B 2240/95* (2013.01); *F05B 2250/241* (2013.01); *F05B 2260/74* (2013.01)

(58) Field of Classification Search
CPC ................ F03B 13/183; F05B 2240/95; F05B 2250/241; F05B 2260/74
See application file for complete search history.

(56) References Cited

U.S. PATENT DOCUMENTS

| | | | |
|---|---|---|---|
| 2020/0056578 A1* | 2/2020 | Sheldon-Coulson | ... B63B 1/048 |
| 2020/0224634 A1* | 7/2020 | Sheldon-Coulson | ......................... H02K 7/183 |
| 2021/0156353 A1* | 5/2021 | Taber | ................... H02K 7/1823 |

FOREIGN PATENT DOCUMENTS

| | | |
|---|---|---|
| CN | 110195683 A | 9/2019 |
| GB | 2489073 A | 9/2012 |
| KR | 100861566 B1 | 10/2008 |

OTHER PUBLICATIONS

IP Australia; Examination Report No.1 from Australian Application No. 2024202916; dated May 7, 2024; in English (3 pages).
IP Australia; Examination Report No. 2 from Australian Application No. 2024202916; dated May 22, 2024; in English (3 pages).
IP Australia; Examination Report No. 3 from Australian Application No. 2024202916; dated May 29, 2024; in English (3 pages).
IP Australia; Response to Examination Report No. 1 from Australian Application No. 2024202916; dated May 20, 2024; in English (5 pages).
IP Australia; Response to Examination Report No. 2 from Australian Application No. 2024202916; dated May 28, 2024; in English (6 pages).

* cited by examiner

*Primary Examiner* — Joseph Ortega
(74) *Attorney, Agent, or Firm* — FITCH, EVEN, TABIN & FLANNERY LLP

(57) ABSTRACT

An offshore floating wave energy generator assembly for installation in an aquatic environment, the generator assembly comprising: a floating sphere having a cutout passage with a convergent configuration for capturing an incoming ocean wave and conveying seawater from a first end of the passage to second end of the passage; a turbine assembly located within an internal volume of the floating sphere, the turbine being positioned at or adjacent the second end of the passage to convert kinetic energy of the captured ocean wave into electricity.

11 Claims, 14 Drawing Sheets

OFFSHORE FLOATING WAVE GENERATOR ASSEMBLY

TECHNICAL FIELD

The present invention relates to an offshore floating wave energy generator apparatus.

BACKGROUND

Ocean waves have a high energy density and are, therefore, prime candidates as a source of renewable energy. Attempts to harness the power of ocean waves date back centuries. Modern interest has surged in recent years as the need for renewable power sources has become more apparent. Large-scale commercial implementation of any ocean wave power generation system has not yet been achieved.

Similarly, aquatic currents such as those of a river are also energy-dense and are also prime candidates as sources of renewable energy. As such it would be highly beneficial for there to be a device that could not just operate in a variety of aquatic environments but capture the energy of either ocean waves, tidal flows and river currents.

Any references to methods, apparatus or documents of the prior art are not to be taken as constituting any evidence or admission that they formed, or form part of the common general knowledge.

SUMMARY OF INVENTION

In an aspect, the invention provides an offshore floating wave energy generator assembly for installation in an aquatic environment, the generator assembly comprising:
a floating sphere having a cutout passage with a convergent configuration for capturing an incoming ocean wave and conveying seawater from a first end of the passage to a second end of the passage and a turbine assembly located within an internal volume of the floating sphere, the turbine being positioned at or adjacent to the second end of the passage to convert kinetic energy of the captured ocean wave into electricity.

In an embodiment, there is provided a yaw controlling member arranged to maintain orientation of the floating sphere to optimize capture of the incoming ocean wave.

In an embodiment, the floating wave energy generator assembly further comprises a coupling arrangement comprising a plurality of mooring lines coupled to the floating sphere, wherein one or more of the mooring lines are coupled to mooring members.

In an embodiment, the floating sphere comprises an in-use lower hemispherical section configured for being submerged in seawater and an in-use upper hemispherical section configured for substantially floating above the seawater to capture the incoming ocean wave.

In an embodiment the cutout passage is located in the in-use upper hemisphere.

In an embodiment, the yaw controlling member is arranged to maintain the orientation of the in-use upper hemispherical portion to optimize capture of the incoming ocean wave into the cutout passage.

In an embodiment, the turbine assembly comprises a hollow cylinder with helical flow directing structures being provided along inner walls of the cylinder such that axial flow of seawater through the cylinder results in a clockwise or counter-clockwise rotation of the cylinder to effect conversion of kinetic energy of the captured ocean wave into electricity.

In an embodiment, the cutout passage comprises a generally flat base with curved walls rising from said flat base such that the curved walls converge towards the second end of the passage. The cutout passage forms a partially cleaved conic section of the floating sphere.

In an embodiment, the coupling arrangement comprises a coupling plate with radially arranged and spaced apart coupling locations for coupling mooring lines.

In an embodiment, the turbine assembly is housed within a turbine housing located within the internal volume, the housing being generally elongate and extending between an inlet end and an outlet end, the inlet end being located continuously relative to the second end of the passage to receive the seawater and convert kinetic energy of the captured ocean wave into electricity and the seawater flows in a direction from the inlet end to the outlet end of the turbine housing.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
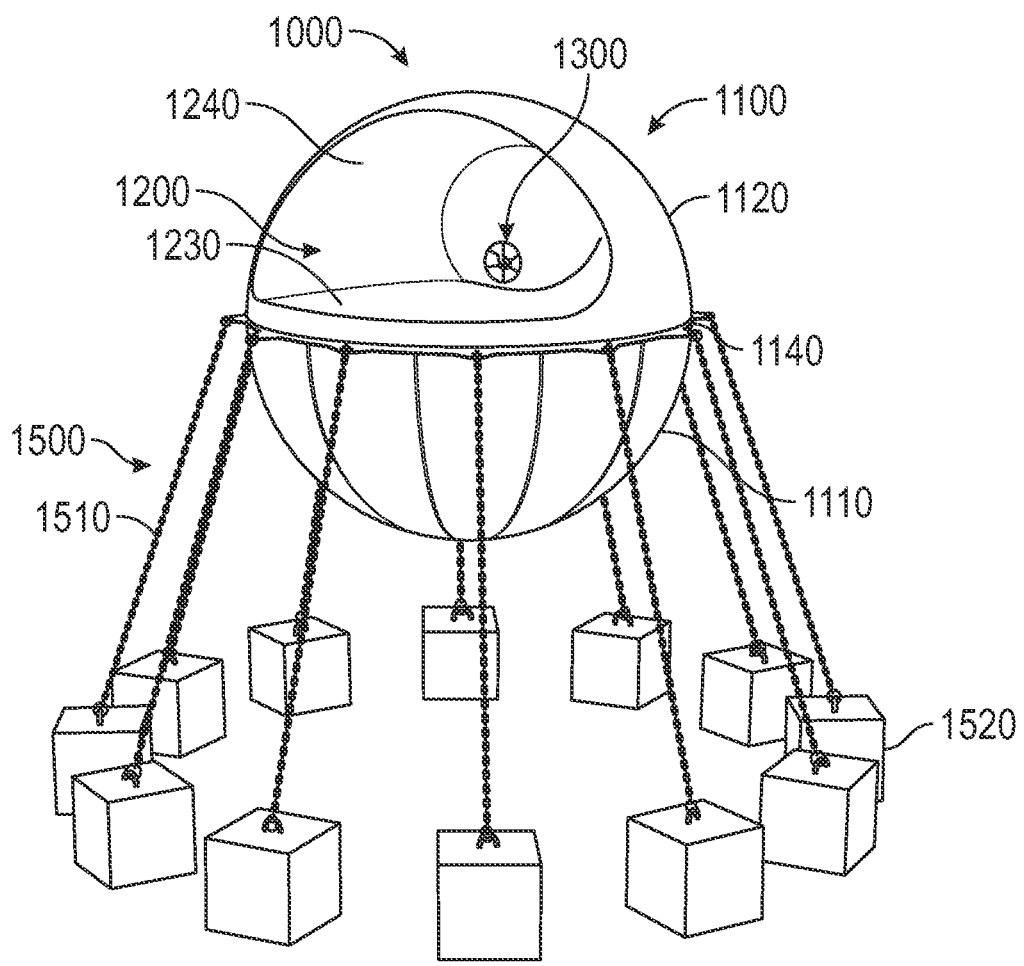
FIG. 1 depicts an offshore floating wave energy generator assembly.
Figure 2:
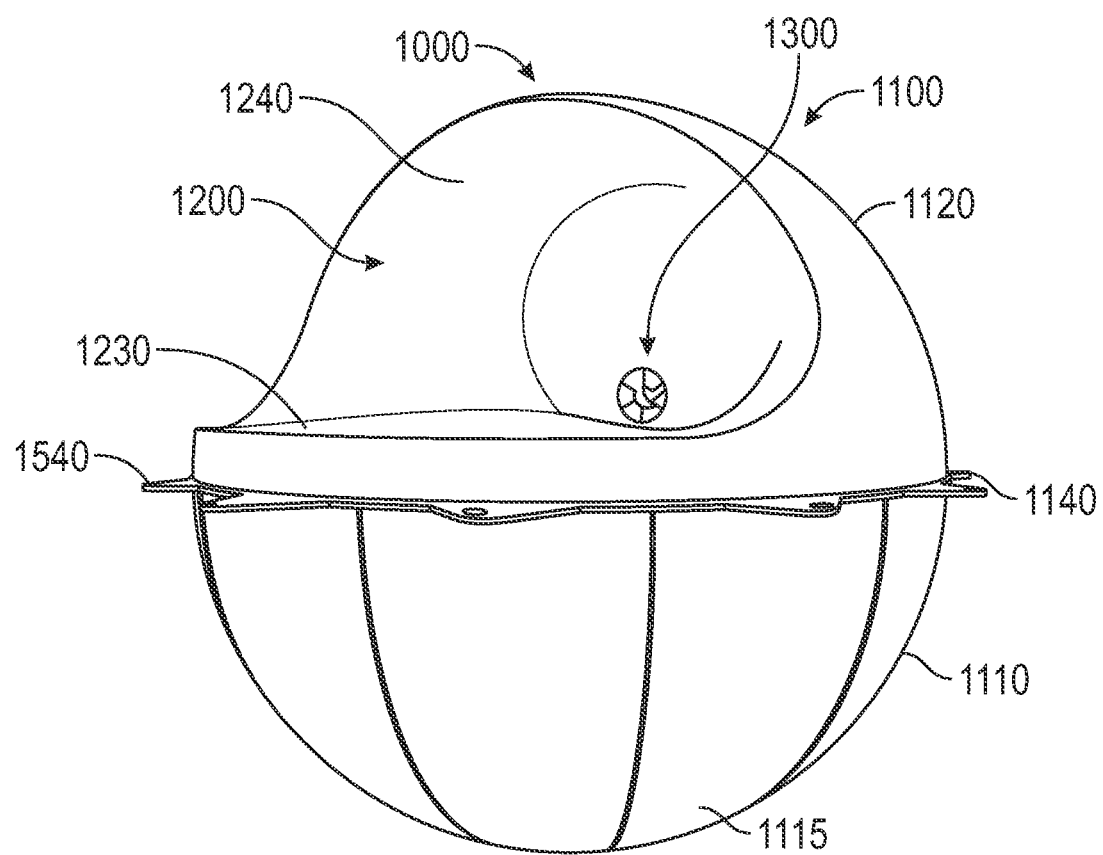
FIG. 2 depicts the offshore floating wave energy generator assembly of FIG. 1 with the coupling arrangement not shown.
Figure 3:
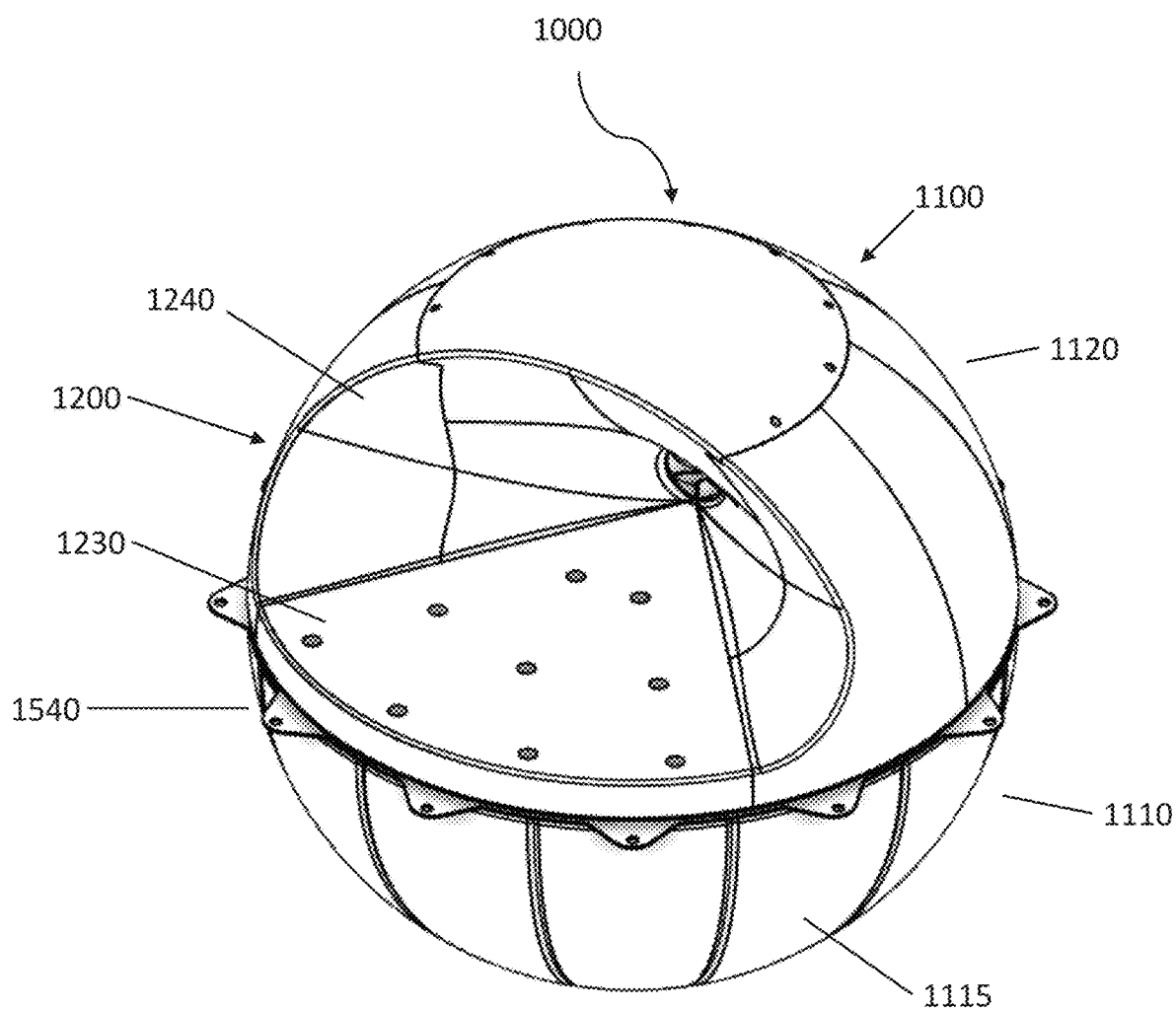
FIG. 3 depicts the offshore floating wave energy generator assembly of FIG. 1 in a top perspective view and displayed as a line drawing.
Figure 4:
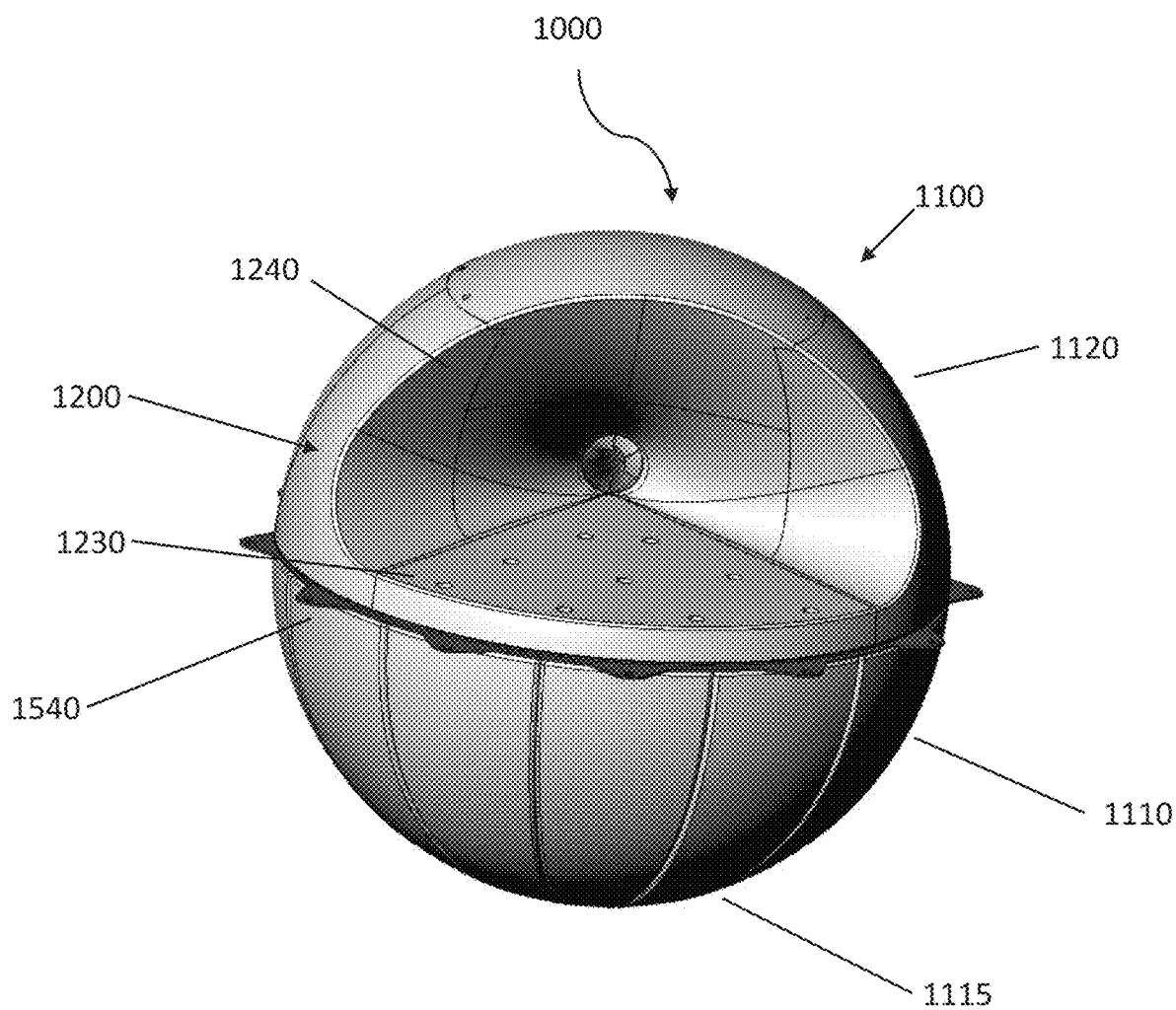
FIG. 4 depicts the offshore floating wave energy generator assembly of FIG. 1 from an alternative perspective view.
Figure 5:
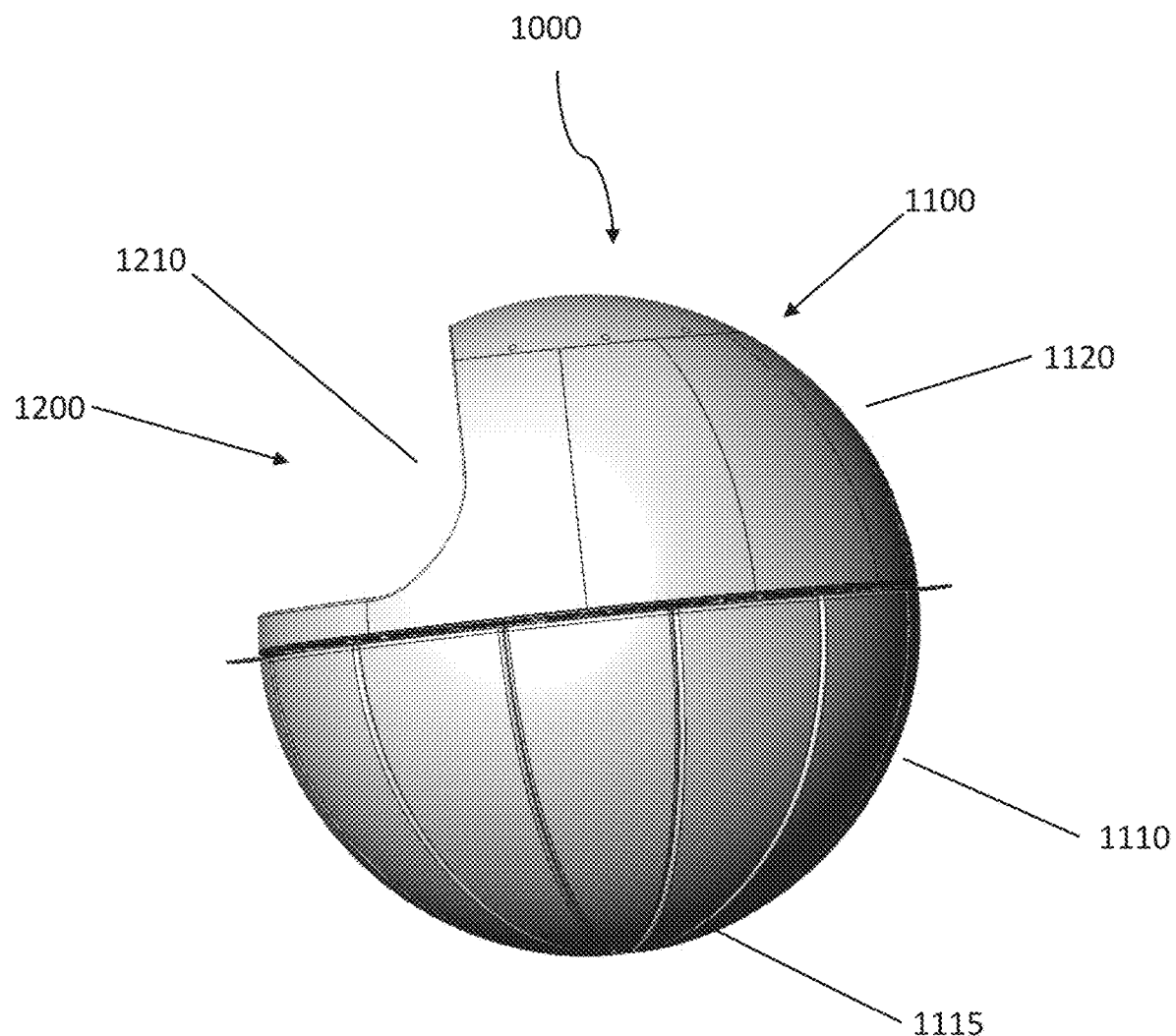
FIG. 5 depicts the offshore floating wave energy generator assembly of FIG. 1 from a side view.
Figure 6:
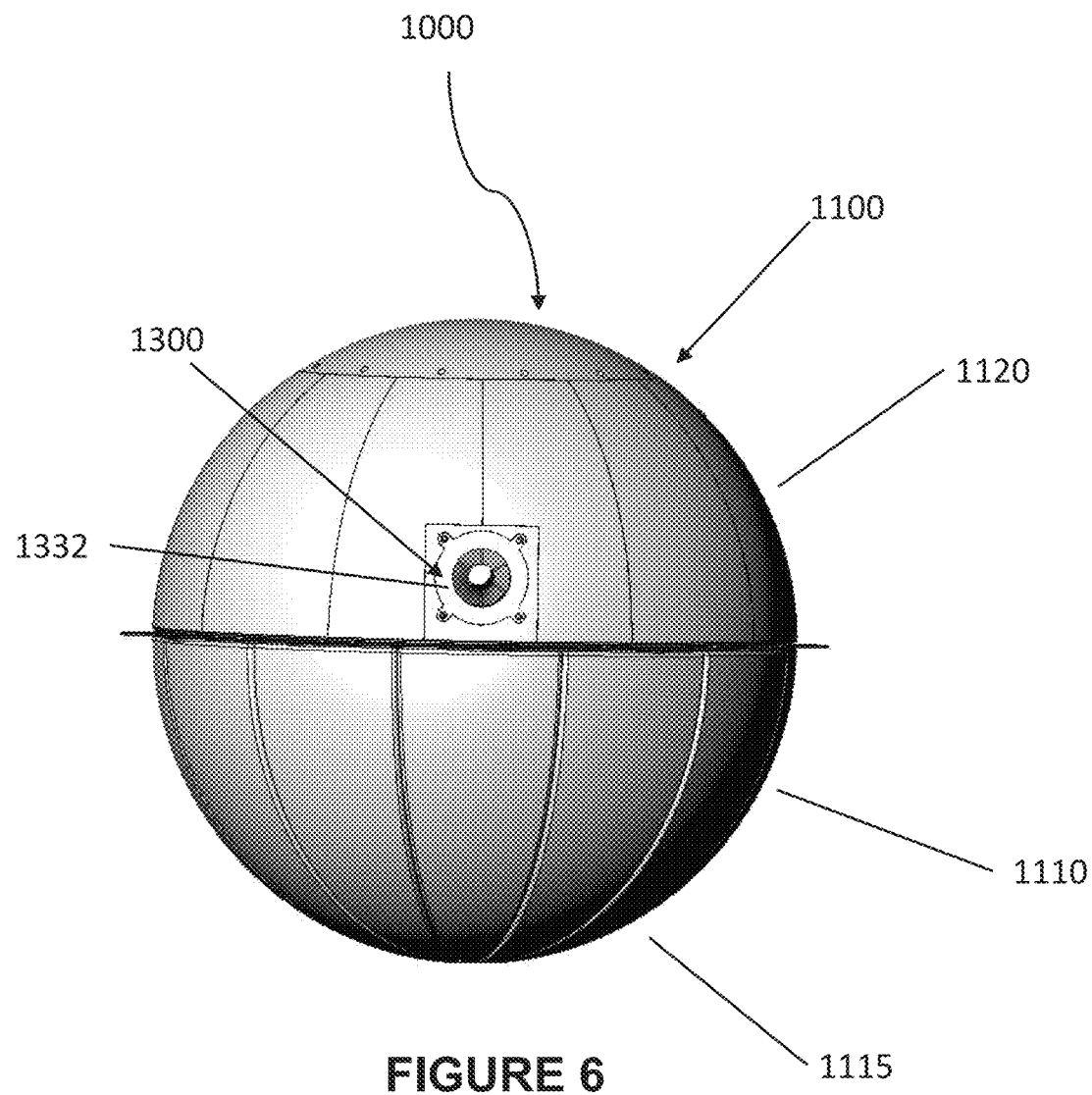
FIG. 6 depicts the offshore floating wave energy generator assembly of FIG. 1 from a rear view.
Figure 7:
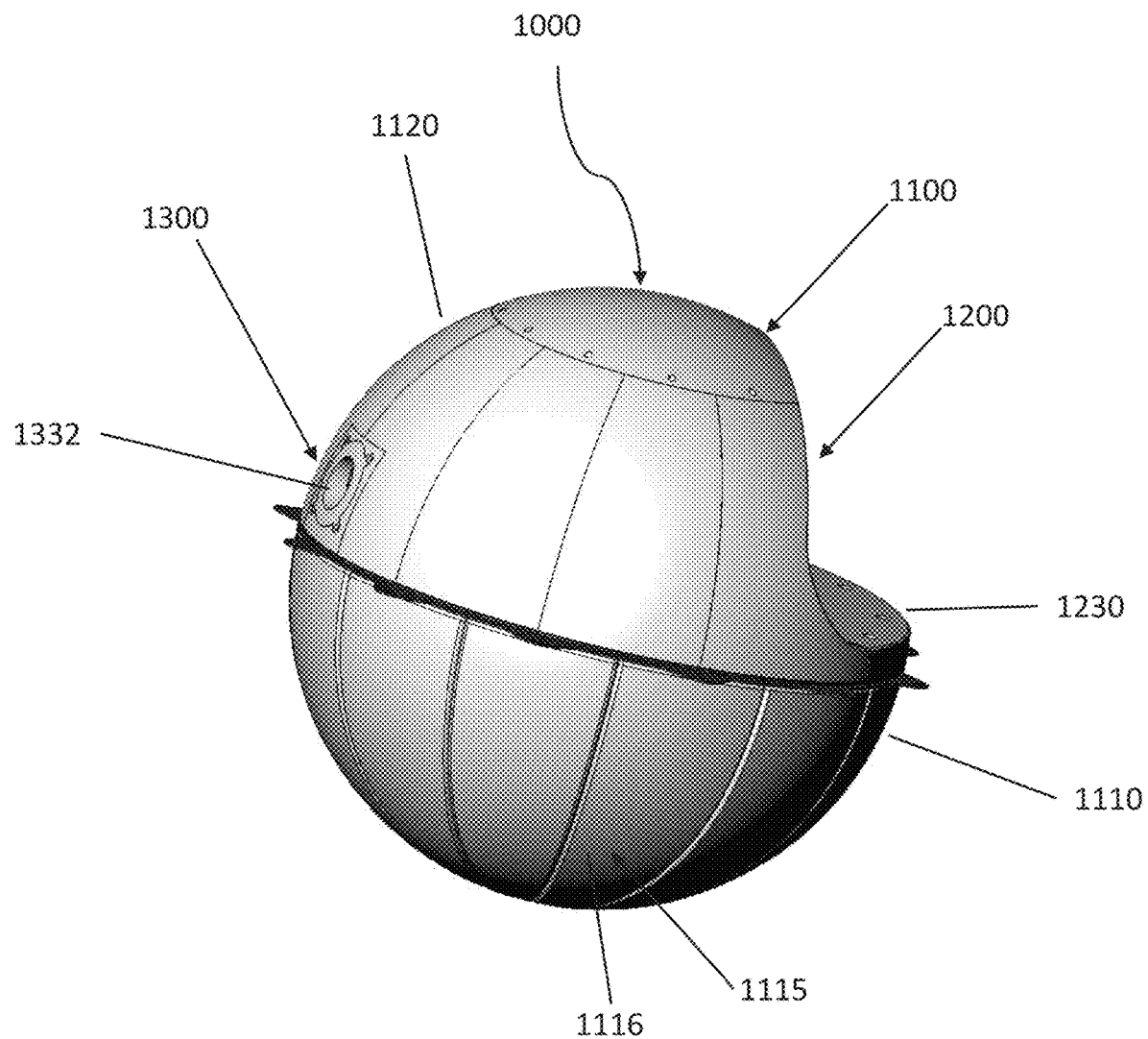
FIG. 7 depicts the offshore floating wave energy generator assembly of FIG. 1 from an alternative side perspective view.
Figure 8:
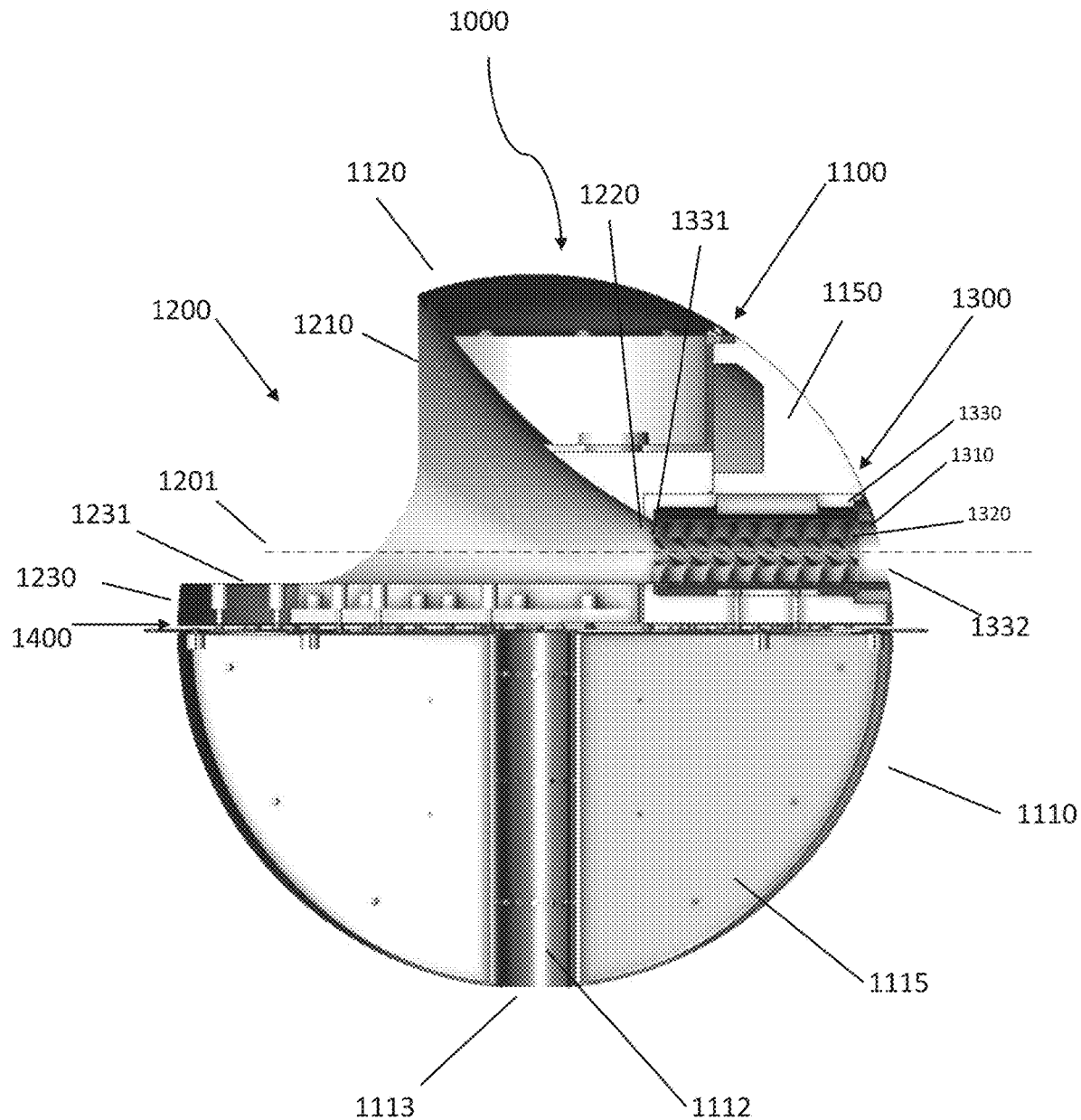
FIG. 8 depicts a vertical plane cutaway or sliced view of the offshore floating wave energy generator assembly of FIG. 1.
Figure 9:
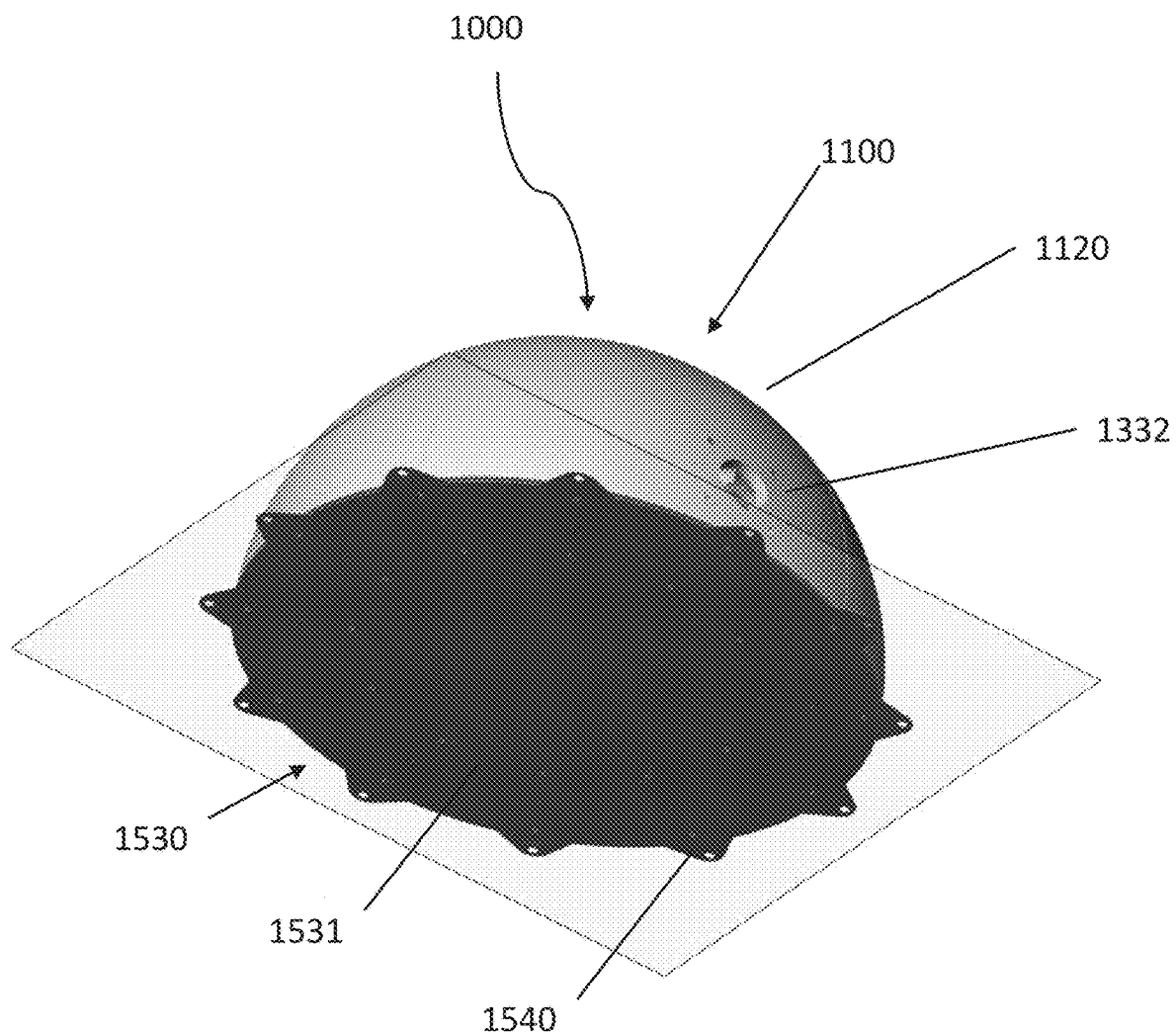
FIG. 9 depicts a horizontal plane cutaway or sliced view of the offshore floating wave energy generator assembly of FIG. 1.
Figure 10:
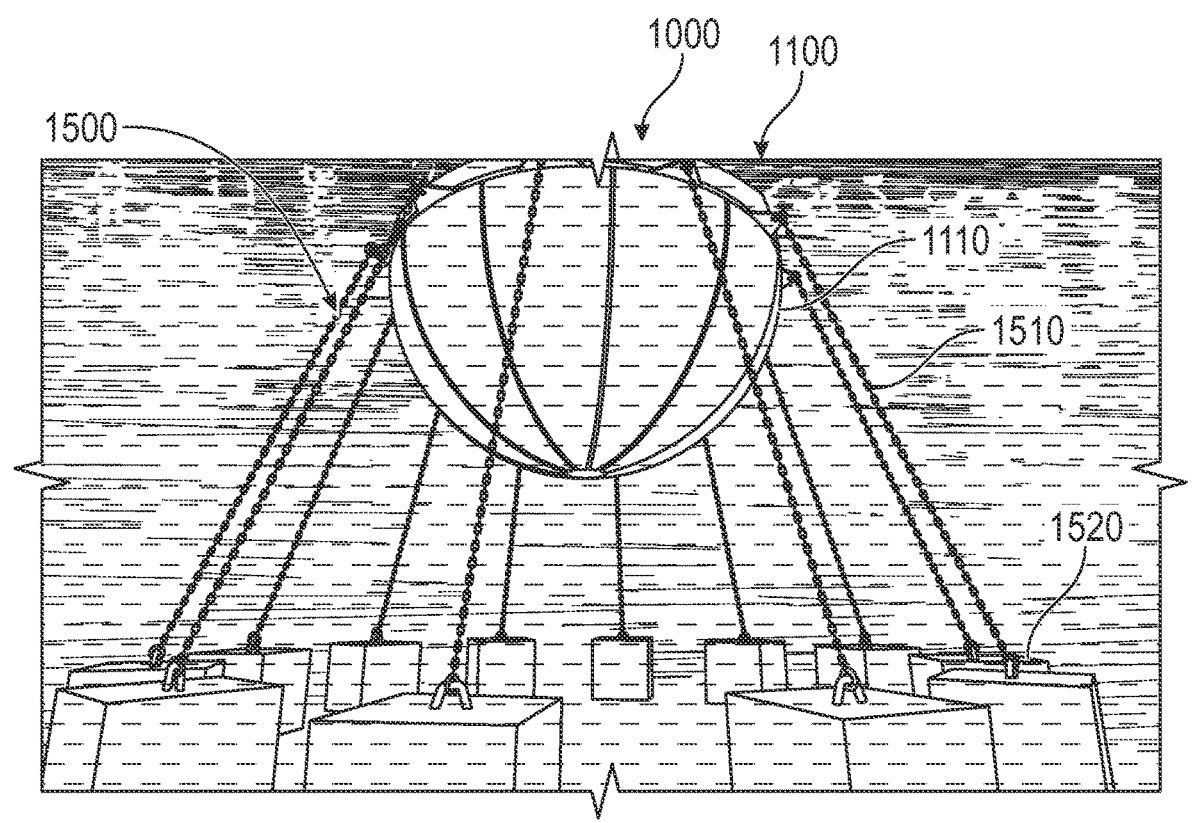
FIG. 10 depicts the offshore floating wave energy generator assembly of FIG. 1 from an in-use, below perspective view.
Figure 11:
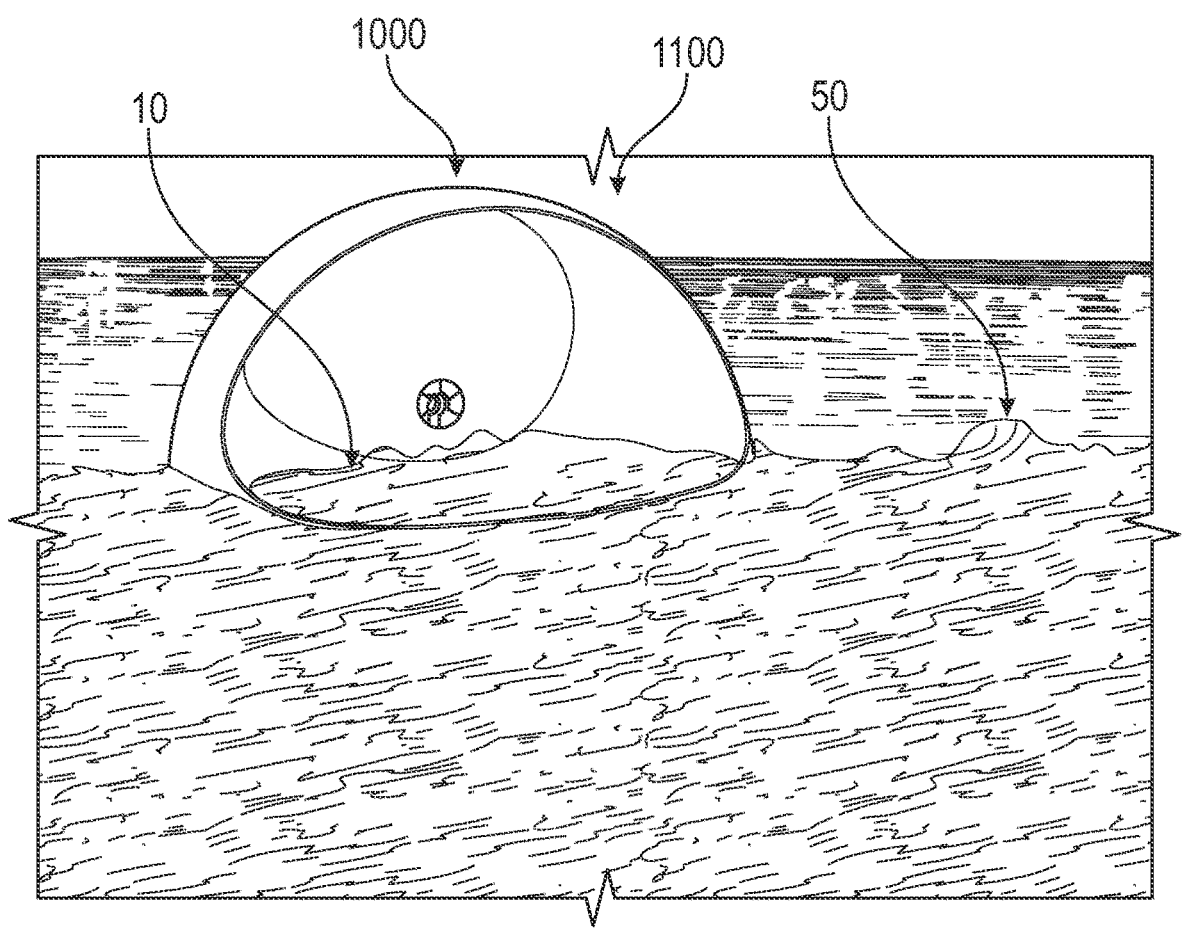
FIG. 11 depicts the offshore floating wave energy generator assembly of FIG. 1 from an in-use, above perspective view.
Figure 12:
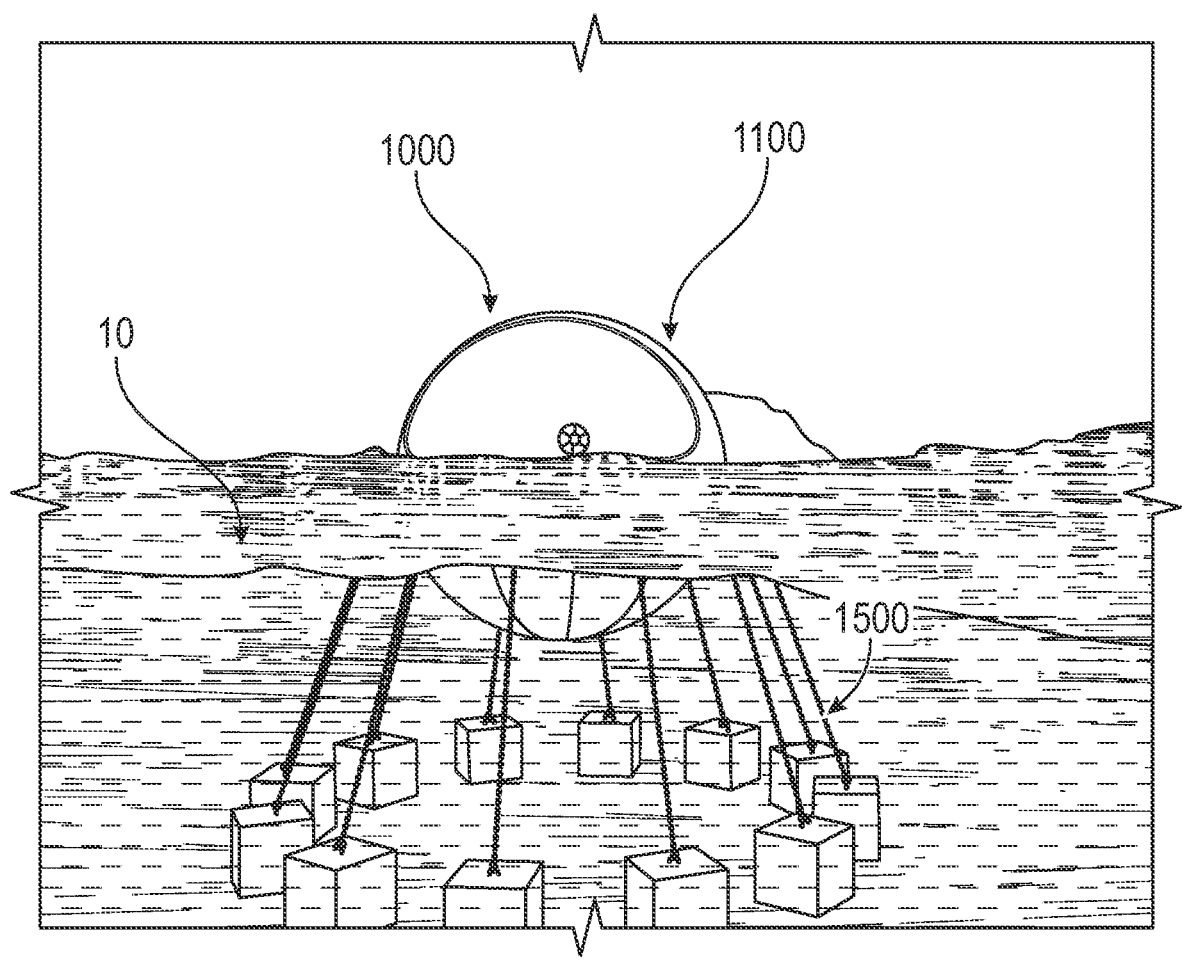
FIG. 12 depicts the offshore floating wave energy generator assembly of FIG. 1 from an in-use, side perspective view.

FIGS. 1 to 14 illustrate an offshore floating wave energy generator assembly 1000 for installation in an aquatic environment. The generator assembly 1000 comprises a floating sphere 1100 with a turbine assembly 1300. The floating sphere 1100 has a cutout passage 1200 with a convergent configuration that acts analogously to a funnel. The cutout passage 1200 captures an incoming ocean wave 50 and conveys seawater 10 from a first end of the passage 1210 to a second end of the passage 1220. Located at or adjacent to said second end of the passage 1220, and located within an internal volume 1150 of the floating sphere 1100, is the turbine assembly 1300. The kinetic energy of the captured ocean wave 50 drives said turbine assembly 1300, which converts said kinetic energy into electrical energy.

Note that the use case of ocean waves 50 should not be considered limiting. The wave energy generator assembly 1000 will function in any aquatic environment with moving water, including rivers, tidal regions, and other similar locations, and any combination of the same such as a tidal river mouth. For the remainder of this document 'ocean wave 50' should be understood to mean any volume of water moving into contact with the floating wave energy generator 1000, and similarly 'seawater 10' is water from any source.

The floating sphere 1100 comprises an in-use lower hemispherical section 1110 configured for being submerged in seawater 10 and an in-use upper hemispherical section 1120 configured for substantially floating above the seawater 10 to capture the incoming ocean wave 50. Known mechanisms and materials may provide buoyancy such that the lower hemisphere 1110 of the floating sphere 1100 is substantially submerged and the upper hemisphere 1120 of the floating sphere 1100 is substantially above the surface of the seawater 10.

In the preferred embodiment, the lower hemisphere is divided into a plurality of radial sectors 1115. Each radial sector 1115 is the same volume as each other radial sector 1115, and the outer surface 1116 of each radial sector 1115 occupies an equal portion of the surface area of the lower hemisphere 1110. In the preferred embodiment, the cavity contained within each radial sector 1115 is filled or partially filled with a buoyant material such as polystyrene. Each radial sector 1115 is securely attached to its circumferential neighbours. Each radial sector 1115 is also securely attached to an axial shaft 1112 that extends from the lower great circle pole 1113 of the lower hemisphere 1110 to a location proximal to the centre of the horizontal equator 1140 of the floating sphere 1100.

The cutout passage 1200 is located in the upper hemisphere 1120. Note that a substantial portion of the said upper hemisphere 1120 has been shaped or removed to accommodate the cutout passage 1200; for brevity of description, the term 'upper hemisphere 1120' will continue to be used.

The cutout passage 1200 comprises a generally flat base 1230 with curved walls 1240 rising from said flat base 1230 such that the curved walls 1240 converge towards the second end of the passage 1220. The cutout passage 1200 forms a partially cleaved conic section of the floating sphere 1100. The curved walls 1240 of cutout passage 1200 describe a funnel-type shape. In the preferred embodiment, the curved walls 1240 of passage 1200 taper from the first end of passage 1210 toward the second end of the passage 1220. The curved walls 1240 are generally concave. The curved walls 1240 are substantially radially symmetric, except where intersected by the flat base 1230.

The turbine assembly 1300 is housed in a turbine housing 1330. The turbine housing 1330 is generally elongate and cylindrical. The hollow cylinder 1310 of the turbine assembly 1300 has an inlet end 1331 that is fluidly connected with the second end of the passage 1220 such that seawater 10 that flows through the cutout passage 1200 must flow into the inlet end 1331 of the hollow cylinder 1310 of the turbine assembly 1300, and subsequently out the outlet end 1332 of the hollow cylinder 1310, which is adjacent to the surface of the upper hemisphere 1120.

The cutout passage 1200 and the cylindrical turbine housing 1330 share a longitudinal central axis 1201 of rotation. In the preferred embodiment, the central axis 1201 is oriented horizontally. The central axis 1201 is colocated with a vertical plane that passes through the lateral centre of the floating sphere 1100; this plane could also be defined as passing between the opposite great circle poles of the sphere 1100. The central axis 1201 is not colinear with any diameter of the floating sphere 1100, that is, it does not pass through the centre of said floating sphere 1100. Rather the central axis 1201 is a chord running through the upper hemisphere 1120 and substantially parallel to the plane of the equator 1140, said plane of the equator 1140 being the plane that divides the upper hemisphere 1120 from the lower hemisphere 1110 while passing through the centre of the floating sphere 1100.

The plane of the flat base 1230 intersects the passage 1200. The curvature of the curved walls 1240 adapts to this, curving in toward the flat base 1230 such that the intersection of the curved walls 1240 and the flat base 1230 is not angled, but is a smooth transition.

In the preferred embodiment, the top surface 1231 of the flat base 1230 is in the upper hemisphere 1120 extending in a plane parallel and substantially adjacent to the equator 1140. In some embodiments the top surface 1231 may be operably located at the average surface level of the water upon which the floating sphere 1100 floats. In other embodiments, the flat base 1230 may be submerged below water level, though still in the vicinity of the surface.

The presence of the flat base 1230 is advantageous compared to a more substantially radially symmetric cutout passage 1200. Without being limited by theory, it is hypothesised that the flat base 1230 is beneficial due to the nature of the motion of water particles in an aquatic surface wave. An aquatic surface wave has both transverse (the visible rising and falling of the peaks and troughs) and longitudinal components (the apparent horizontal motion of a wave peak or trough). Although the wave itself may traverse potentially vast distances in the longitudinal direction, the water particles in a surface wave themselves are relatively stationary and move in a circular orbital pattern along with the transverse component of the surface wave. As such, when a surface wave encounters the flat base 1230 of the cutout passage 1200, the transverse component of the orbital motion of the water particles is interrupted. The water particles then flow substantially linearly across the top surface 1231 of the flat base 1230 and through the cutout passage 1200, whereafter the water particles pass through the turbine assembly 1300.

The tapering that occurs from the first end of the passage 1210 to the second end of the passage 1220 increases the linear velocity of the flow of the water particles according to the law of conservation of mass for fluids. In an embodiment where the flat base 1230 is not present, and the cutout passage 1200 is substantially radially symmetric, the circular orbital motion of the water particles that pass into the cutout passage 1200 would not be interrupted to the same extent, and substantially less of the kinetic energy of the ocean wave 50 could be captured. An embodiment without the flat base 1230 may still be advantageous for capturing energy from river or tidal flows.

Figure 13:
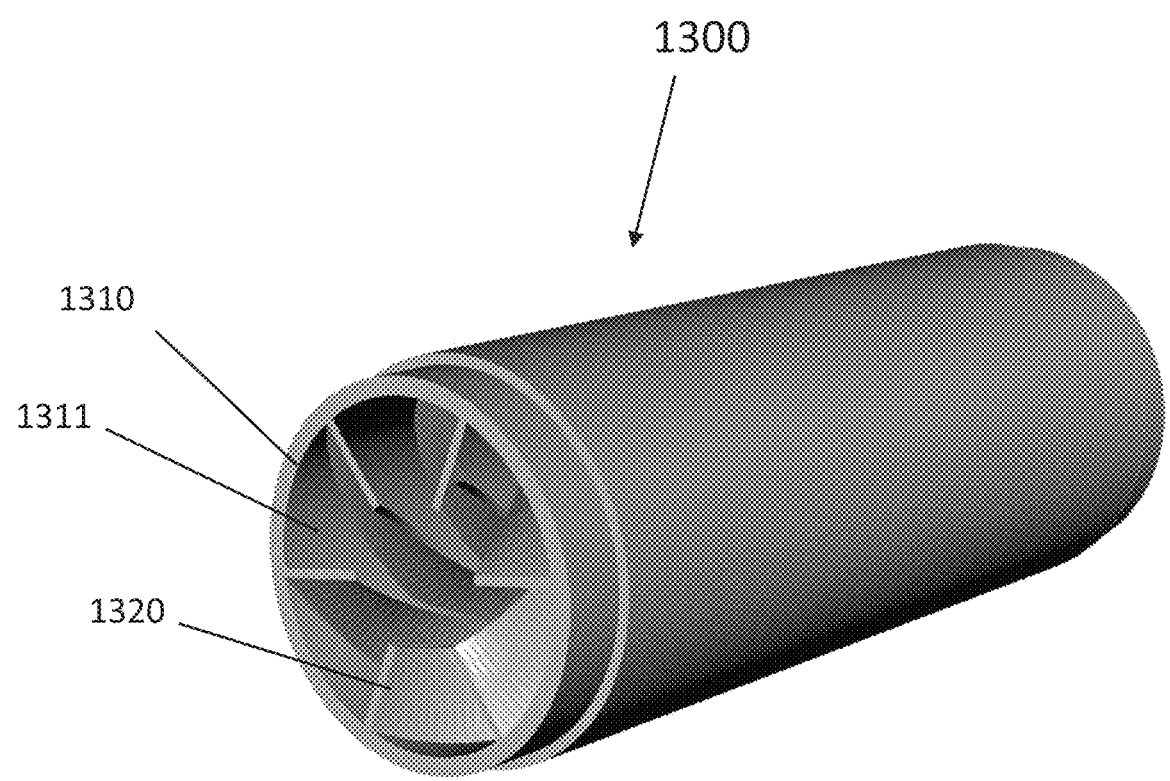
FIG. 13 depicts the turbine assembly of the offshore floating wave energy generator assembly of FIG. 1.
Figure 14:
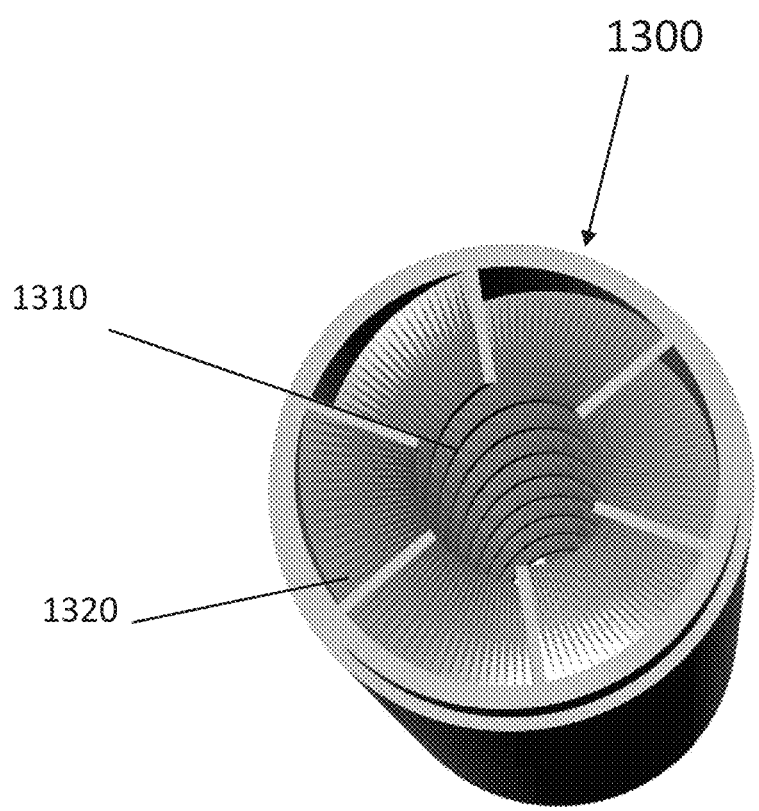
FIG. 14 depicts the turbine assembly of the offshore floating wave energy generator assembly of FIG. 1 from an alternative angle.

The turbine assembly 1300 is housed within the turbine housing 1330. The turbine housing 1330 is located within the internal volume 1150 of the floating sphere 1100. In the preferred embodiment, the turbine assembly 1300 comprises a hollow cylinder 1310 with helical flow directing structures 1320 being provided along inner walls 1311 of the cylinder 1310, as best seen in FIGS. 13-14. Axial flow of seawater 10 through the cylinder 1310 results in a clockwise (or counter-clockwise) rotation of the cylinder 1310. In the known manner of electrical energy generation via mechanical rotation, the rotation of the cylinder interacts with an electricity generating mechanism 1340 (not pictured) to effect the conversion of the kinetic energy of the captured ocean wave 50 into electricity. In other embodiments, ocean wave 50 flow through the turbine assembly 1300 may result in the generation of electrical energy by some other mechanism.

In order to reliably transmit electrical energy to a grid or user, the offshore floating wave energy generator assembly 1000 should remain in a relatively stationary geographic location. Additionally, In order for an ocean wave 50 to pass through the cutout passage 1200, through the turbine assembly 1300, and hence generate electrical energy, the longitudinal axis of an impacting ocean wave 50 should be predominantly aligned with the central axis 1201 of the turbine assembly 1300, though it must be noted that the curved walls 1240 and open first end 1210 of the cutout passage 1200 will accommodate incoming ocean waves 50 from a variety of incident angles. That is, a forward-travelling peak of an ocean wave 50 needs to pass into the first end of the passage 1210. As such the offshore floating wave energy generator assembly 1000 needs to be predominantly secure in place and be reliably orientable.

In an embodiment, the floating wave energy generator assembly 1000 further comprises a coupling arrangement 1500 comprising a plurality of mooring lines 1510 coupled to the floating sphere 1100, wherein one or more of the mooring lines 1510 are coupled to mooring members 1520. The coupling arrangement 1500 comprises a coupling plate 1530 with radially arranged and spaced apart coupling locations 1540 for coupling mooring lines 1510.

The coupling arrangement 1500 serves the practical purpose of mooring the floating sphere 1100. All features of the coupling arrangement 1500 are directed toward this purpose.

In the preferred embodiment, said coupling plate 1530 is located in the vicinity of the equator 1140 of the floating sphere 1100, and comprises a flat circular plate 1531 with a radius that is similar to that of the floating sphere 1100, the plane of which is parallel to the plane defined by the equator 1140. A plurality of evenly spaced coupling locations 1540 protrude from the rim of said flat circular plate 1531. A mooring line 1510 such as a steel cable extends from each coupling location 1540 to a mooring member 1520. In other embodiments, the coupling locations 1540 may have a different geometry. In some embodiments, the coupling locations 1540 may comprise a winch mechanism 1545 (not pictured) for controlling the deployed length of a mooring line 1510. In the preferred embodiment, a mooring member 1520 is a fabricated steel cage holding high density magnetite, but in other embodiments may be a conventional anchor or any other object or arrangement suitable for securely attaching the distal end of a mooring line 1510 in place. In the preferred embodiment, there is a plurality of mooring members 1520 in place on the floor of the ocean (or equivalent body of water), spaced in such a way that each mooring member 1520 has a single mooring line 1510 securely attached to it, and such that each mooring line 1510 extends radially outward, away from the centre of the floating sphere 1100. As such, the floating sphere 1100 remains located within a circle described by the placement of the mooring members 1520. In the preferred embodiment, the coupling arrangement 1500 is securely attached to the lower hemisphere 1110, and rotatably attached to the upper hemisphere 1120.

Orientation of the first end of the passage 1210 is maintained by the provision of a yaw controlling member 1400. In particular, the yaw controlling member 1400 is arranged to maintain the orientation of the upper hemisphere 1120 to optimize capture of the incoming ocean wave 50 into the cutout passage 1200. The yaw controlling member 1400 is a rotatable connector between the lower hemisphere 1110 and the upper hemisphere 1120. While the lower hemisphere 1110 maintains a constant orientation via attached mooring lines 1510, the upper hemisphere 1120 can rotate. In the preferred embodiment, the upper hemisphere 1120 is able to rotate freely, but in some embodiments rotation may be constrained to occur within a specified angle. Rotation of the yaw controlling member 1400 (and hence the upper hemisphere 1120) may be according to any practical mechanism; for example, mechanical bearings, ring gearing or controlled magnetic levitation. Orientation is maintained via the action of the ocean wave 50 passing through the cutout passage 1200 and the turbine assembly 1300. The inner surfaces of the cutout passage 1200 and turbine assembly 1300 are pushed by the incoming ocean wave 50, causing the upper hemisphere 1120 to rotate.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An offshore floating wave energy generator assembly for installation in an aquatic environment, the offshore floating wave energy generator assembly comprising:
    a floating sphere having a cutout passage with a convergent configuration for capturing an incoming ocean wave and conveying seawater from a first end of the cutout passage to a second end of the cutout passage, the first end of the cutout passage being in an in-use upper hemispherical section of the floating sphere; and
    a turbine assembly located within an internal volume of the floating sphere, the turbine assembly being positioned at or adjacent the second end of the cutout passage to convert kinetic energy of a captured incoming ocean wave into electricity.

2. The offshore floating wave energy generator assembly in accordance with claim 1 further comprising a yaw controlling member arranged to maintain orientation of the floating sphere to optimize capture of the incoming ocean wave.

3. The offshore floating wave energy generator assembly in accordance with claim 2 wherein the floating sphere comprises:
   an in-use lower hemispherical section configured for being submerged in seawater; and
   wherein the in-use upper hemispherical section is configured for substantially floating above the seawater to capture the incoming ocean wave.

4. The offshore floating wave energy generator assembly in according to claim 2 wherein the yaw controlling member is arranged to maintain the orientation of the in-use upper hemispherical section to optimize capture of the incoming ocean wave into the cutout passage.

5. The offshore floating wave energy generator assembly in accordance with claim 1 further comprising a coupling arrangement comprising a plurality of mooring lines coupled to the floating sphere.

6. The offshore floating wave energy generator assembly in accordance with claim 5 wherein one or more of the mooring lines are coupled to mooring members.

7. The offshore floating wave energy generator assembly in accordance with claim 5 wherein the coupling arrangement comprises a coupling plate with radially arranged and spaced apart coupling locations for coupling mooring lines.

8. The offshore floating wave energy generator assembly in accordance with claim 1 wherein the turbine assembly comprises a hollow cylinder with helical flow directing structures being provided along inner walls of the hollow cylinder such that axial flow of seawater through the hollow cylinder results in a clockwise or counter-clockwise rotation of the hollow cylinder to effect conversion of kinetic energy of the captured incoming ocean wave into electricity.

9. The offshore floating wave energy generator assembly in accordance with claim 1 wherein the cutout passage comprises a generally flat base with curved walls rising from said flat base such that the curved walls converge towards the second end of the cutout passage.

10. The offshore floating wave energy generator assembly in accordance with claim 1 wherein the cutout passage forms a partially cleaved conic section of the floating sphere.

11. The offshore floating wave energy generator assembly in accordance with claim 1 wherein the turbine assembly is housed within a turbine housing located within the internal volume, the turbine housing being generally elongate and extending between an inlet end and an outlet end, the inlet end being located continuously relative to the second end of the cutout passage to receive the seawater and convert kinetic energy of the captured incoming ocean wave into electricity and the seawater flows in a direction from the inlet end to the outlet end of the turbine housing.

* * * * *